United States Patent
Martin et al.

[11] Patent Number: 6,003,877
[45] Date of Patent: Dec. 21, 1999

[54] INSULATED HEAT EXHAUST GASKET

[75] Inventors: Neil Allen Martin, Naperville; David James Schweiger, Downers Grove, both of Ill.

[73] Assignee: Dana Corporation, Toledo, Ohio

[21] Appl. No.: 08/859,447

[22] Filed: May 20, 1997

[51] Int. Cl.⁶ .................................................. F16J 15/12
[52] U.S. Cl. ...................... 277/592; 277/597; 277/598; 277/627; 277/924
[58] Field of Search .................................. 277/597, 592, 277/598, 616, 627, 917, 924, 591; 411/149, 150, 542, 544, 915

[56] References Cited

U.S. PATENT DOCUMENTS

| | | |
|---|---|---|
| 1,724,595 | 8/1929 | Hyle ........................................ 411/149 |
| 1,772,173 | 8/1930 | Yates ........................................ 277/312 |
| 1,788,041 | 1/1931 | Balfe . |
| 1,819,694 | 8/1931 | Sperry . |
| 2,034,610 | 3/1936 | Dickson . |
| 2,397,597 | 4/1946 | Dunkle . |
| 3,806,138 | 4/1974 | Herrington . |
| 4,083,570 | 4/1978 | Sugawara ................................ 277/597 |
| 4,196,913 | 4/1980 | Oka . |
| 4,387,904 | 6/1983 | Nicholson . |
| 4,400,000 | 8/1983 | Moerk, Jr. . |
| 4,540,183 | 9/1985 | Schneider et al. ...................... 277/312 |
| 4,648,607 | 3/1987 | Yamada et al. . |
| 4,676,515 | 6/1987 | Cobb . |
| 4,728,110 | 3/1988 | Nakasone . |
| 4,739,999 | 4/1988 | Ishii et al. . |
| 4,767,124 | 8/1988 | Udagawa . |
| 4,813,691 | 3/1989 | Schoenborn .......................... 277/598 |
| 5,700,012 | 12/1997 | Froehlich et al. ................. 277/627 X |

*Primary Examiner*—Anthony Knight
*Assistant Examiner*—Marcus Dolce
*Attorney, Agent, or Firm*—Rader, Fishman & Grauer PLLC

[57] ABSTRACT

An insulator gasket is disclosed having gasket sections folded toward each other to form an angled gap of 1–15 degrees. Openings in the gasket sections are partially aligned and allow passage of fastener devices during assembly. The gasket includes a composite construction having a metallic backing plate connected to an insulator layer. The present invention utilizes either a continuous hinge or spaced apart straps.

10 Claims, 2 Drawing Sheets

U.S. Patent    Dec. 21, 1999    Sheet 1 of 2    6,003,877
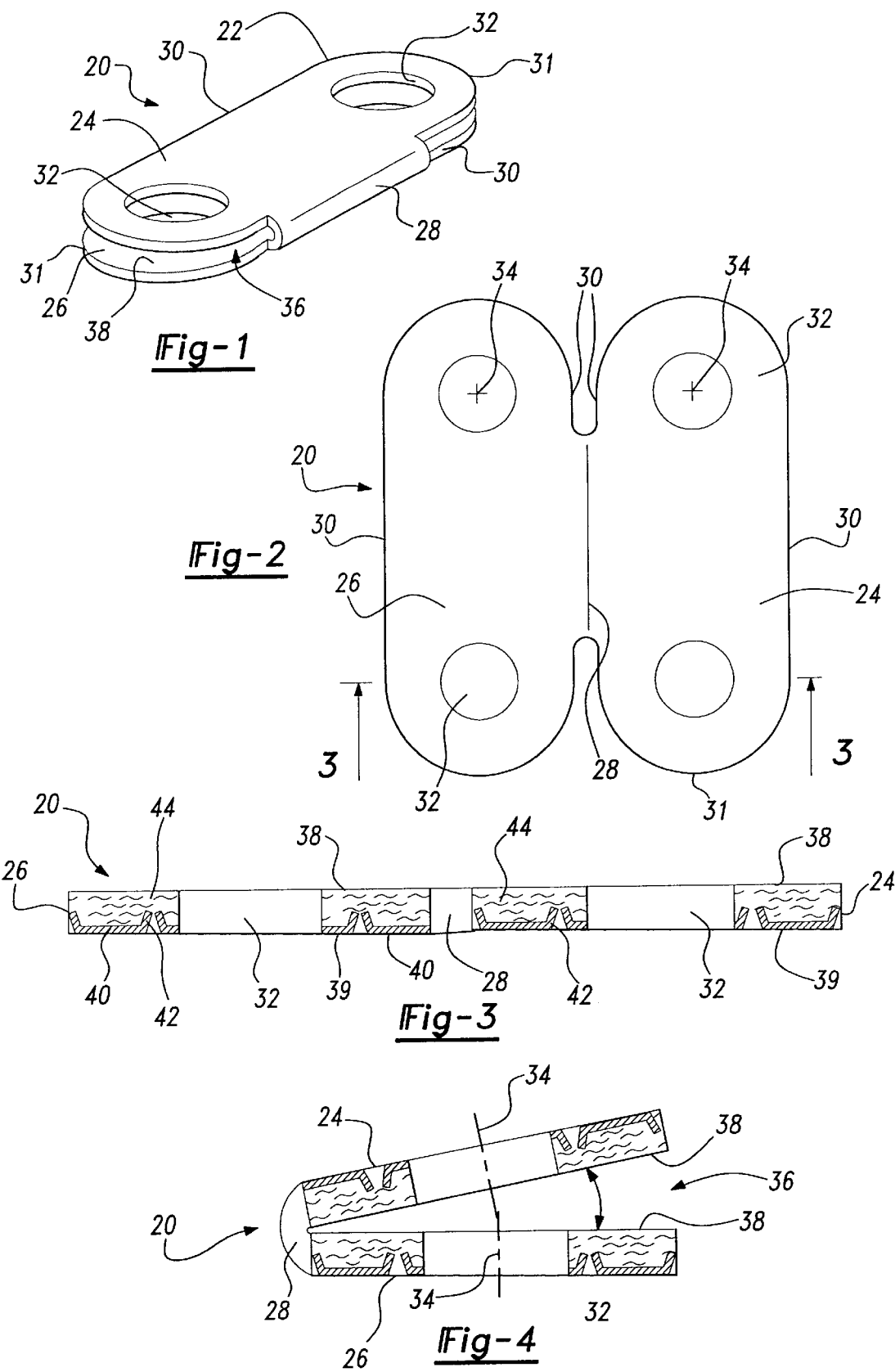

INSULATED HEAT EXHAUST GASKET

FIELD OF THE INVENTION

The present invention relates to a gasket and, more particularly, to a heat insulator gasket for insulating a high temperature member from a low temperature member. The inventive gasket includes two halves folded toward one another and having an angled gap therebetween. Openings in the gasket halves are partially aligned to allow insertion of fastener devices.

BACKGROUND OF THE INVENTION

Gaskets are well known devices provided at interfacing joints for insulating a high temperature surface from a mating lower temperature surface to reduce undesirable heat transfer between the surfaces. For example, such gaskets may be used between an exhaust bracket and a body frame member on an internal combustion vehicle.

Known gaskets are fabricated from either a single layer or multiple layers of material. Multiple layer gaskets combine the benefits of two dissimilar materials. For example, one material may have increased wear resistance, but poor sealing ability. Another material can be placed on top of the first material to increase sealing. Multiple layer gaskets have gained popularity for their ability to provide increased performance and life. Typically, rivets or other fastening devices are used to keep the layers in contact.

One known gasket is made by folding two gasket halves together into engagement. Clamping devices are utilized to keep the halves engaged. The clamping devices are relatively small compared to the overall gasket length and provide little, if any, structural support. However, the use of clamping devices reduces the insulative nature of the gasket by providing a heat transfer path way. Additionally, clamping devices reduce the force available for sealing the gasket since clamping devices can interfere with the mating members before they are fully tightened together. Further, processing costs are increased by having to maintain the folded halves in engaging contact Gasket cost is also increased through the use of separate clamping devices. Finally, a fully folded and clamped gasket cannot provide a resilient spring biasing force to prevent unwanted loosening of fasteners caused by vibration.

SUMMARY OF THE INVENTION

The present invention is directed to a partially folded insulator gasket. The gasket includes plural sections interconnected by an integral hinge portion located along an outer periphery of the gasket. At least one opening is provided in each section. The openings are sized and located so as to partially align and opposingly face each other when the gasket is folded to a predetermined acute angle. A gap is defined by the inner surfaces of the folded gasket and can be any acute angle, including approximately 1–15 degrees.

The present gasket provides easier manufacturing and easier assembly because it eliminates the need for retaining devices to hold the sections in engaging contact with one another. The gap angle is maintained by the deformed gasket material, not through the use of extra components. Also, the gasket produces a resilient biasing force on fasteners used to hold the mating members together. The biasing force helps prevent fastener loosening due to vibration. A single layer or multiple layers of material can be used for each gasket section. The illustrated embodiments have a two layer composite design allowing a strong, ductile material to be combined with an excellent heat insulator layer.

BRIEF DESCRIPTION OF THE DRAWINGS

The features and inventive aspects of the present invention will become more apparent upon reading the following detailed description, claims, and drawings, of which the following is a brief description:

FIG. 1 is perspective view of a gasket according to the present invention.

FIG. 2 is a top view of a gasket prior to folding.

FIG. 3 is a cross-sectional view of FIG. 2.

FIG. 4 is a cross-sectional view of a folded gasket according to the present invention.

DETAILED DESCRIPTION OF PREFERRED EMBODIMENTS

Figure 5:
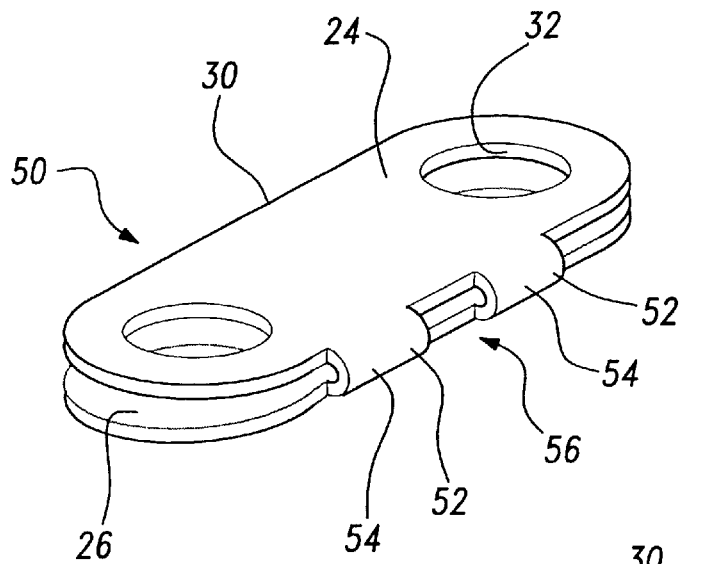
FIG. 5 is a perspective view of a second embodiment of the present invention.

FIG. 1 shows a gasket 20 for use in an interface between opposing surfaces (not shown) of mating members, such as a vehicle exhaust hanger bracket (not shown) and a body frame member(not shown). Gasket 20 has a generally oval gasket body 22 that includes an upper gasket section 24 connected to a lower gasket section 26 by a hinge portion 28. At the periphery of upper and lower sections 24, 26 are opposed straight sides 30 connecting opposed curved ends 31. Hinge portion 28 is located between upper and lower sections 24, 26 along a corresponding pair of straight sides 30. Additionally, one or more openings 32 are formed in upper and lower sections 24, 26 at predetermined locations and designed to receive fasteners (not shown) or to be aligned with bores (not shown) formed in the mating surfaces (not shown). The periphery of each opening 32 extends about a central axis 34 defining the center of the opening. Upper and lower sections 24, 26 are shown folded substantially toward each other in facing relationship. However, upper and lower sections 24, 26 do not engage one another. Instead, there is a gap 36 defined by inner surfaces 38 of gasket 20.

FIG. 2 shows gasket 20 prior to being folded into final form. Gasket 20 is substantially flat with sections 24, 26 being laterally spaced apart and connected by hinge portion 28. Inner and outer surfaces 38, 39 of sections 24, 26 are substantially flat. Preferably, hinge portion 28 extends continuously along a majority of the length of respective straight sides 30 to ensure a strong interconnection, consistent bending, and simplified manufacturing.

Openings 32 can be located as needed. However, they should be formed so as to partially align with one another when gasket 20 is folded to a predetermined acute angle. In the present embodiment, openings 32 allow fastener devices to pass through to couple with fastener bores in the mating surface. Therefore, openings 32 need to partially align to the extent that they will allow access to bores or fasteners in the mating surfaces. Other openings may also be formed in gasket 20 to allow for fluid passage, if required.

Gasket 20 can be made from either a single material layer or multiple layers of material. FIG. 3 shows a cross-section of FIG. 2 including a perforated metallic base plate 40 having multiple prongs 42 that secure a heat insulating layer 44. A preferred material for layer 44 is a non-asbestos, asphalt binder having a paper backing. The preferred design enables cost-effective heat insulating and ease of processing without extra fastening devices.

FIG. 4 shows gasket 20 folded to its final position before installation. Preferably, upper and lower sections 24, 26 are folded to within approximately 15 degrees of full contact. Angled gap 36 is located between gasket inner surfaces 38 that define an acute angle, B, of approximately 1 to 15 degrees. At such angles, openings 32 are partially, but not fully, aligned in overlying pairs to allow fastener devices to pass therethrough during installation. Opening 32 in upper section 24 is angled relative to opening 32 in lower section 26 such that the central axes 34 intersect.

The range for gap angle B of between 1 to 15 degrees has been found sufficient for achieving adequate alignment of openings 32. Dimensional tolerances for the size of opening 32 and geometrical tolerances for opening locations, stack up to create insufficient alignment, when angles greater than 15 degrees are employed. If tighter opening tolerances can be maintained, the gap angle B may be increased. However, tighter tolerances generally have increased manufacturing costs. Therefore, by providing a large range of acceptable gasket angles, the present invention allows the use of looser tolerances that are more cost effective. Finally, the angular range allows greater freedom during manufacturing since precise angular displacement within that range is not required.

Another benefit of the present design is that the number of parts and assembly steps are reduced. No separate rivets, clamps or adhesives are needed to maintain the gasket sections in engagement. Rather, gasket 20 is compressed into engagement by the mating surfaces as they are fastened together. Also, inherent resiliency in gasket 20 provides a pre-load on fasteners, like bolts. The pre-load helps prevent unwanted fastener loosening caused by vibration.

Figure 6:
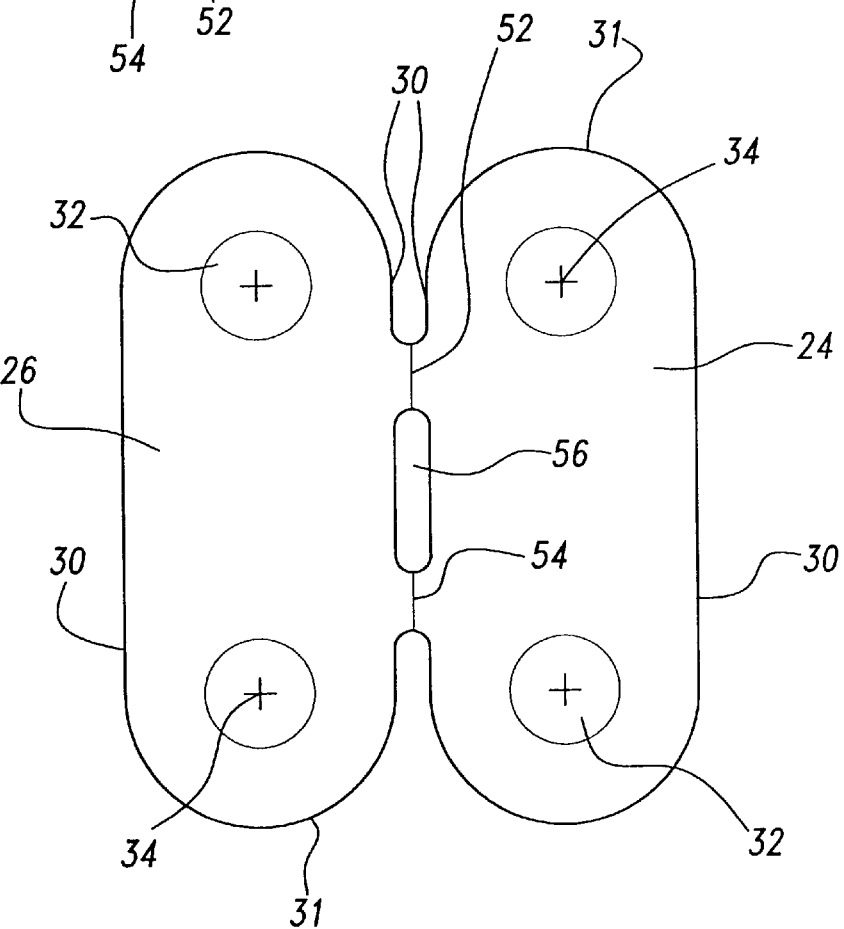
FIG. 6 is a top view of a gasket prior to folding.

FIG. 5 shows another embodiment of the present invention. Gasket 50 has many of the same features as gasket 20. The same reference numbers are employed to One main difference from the FIG. 1 embodiment, is the hinge portion 52. In contrast with continuous hinge portion 28, hinge portion 52 is a discontinuous hinge having plural spaced apart straps 54. Two straps 54 are shown in FIG. 5, but any number of straps can be used as desired. The amount of force to fold gasket 50 would be less than gasket 20 since there is less hinge area But, control during folding is sacrificed using a discontinuous hinge since one strap 54 may bend prior to another strap 54. Inconsistent bending could lead to skewing of the upper and lower sections 24, 26, resulting in improperly aligned openings 32. Also, it is easier to fabricate a gasket 20 as shown in FIG. 2 as compared to gasket 50 of FIG. 6. Gasket 50 requires an added cut-out 56 that increases tooling costs. Finally, spaced apart straps 54 utilize less material, thereby reducing heat transfer between sections 24, 26. Although gasket 20 has a continuous hinge portion 28, it is located outside the main area of contact, therefore unwanted heat transfer is minimal.

Certain modifications are readily apparent for the present invention. The following discussion is merely exemplary of some possible modifications. First, although two sections are shown folded together, it is contemplated that any number of sections may be provided and folded together to make a gasket. Additionally, the gasket of the present invention can be any suitable material and any suitable shape, not just oval. Nor is the invention limited to vehicle exhaust systems. Any suitable environment is contemplated. Moreover, the hinge portion can be placed anywhere on the outer periphery where gasket operation is not adversely affected. Gasket openings can vary from each other and be of different sizes or shapes.

Gaskets 20, 50 can be fabricated using any conventional technique including stamping or punching. First, a base sheet of material has multiple small perforations formed therein which have prongs 42 projecting from one side of the sheet Next, a layer of insulating material is attached to the base sheet using prongs 42 as retention devices. Also, multiple openings are formed in the sheet at preselected locations to match with mating bores or fasteners. Then, the overall gasket shape is formed with plural sections connected by hinge portions that are designed to be folded. Finally, the gasket sections are folded along the hinge portions to form gap angle B of approximately 1–15 degrees so as to partially align the openings in facing relationship.

Preferred embodiments of the present invention have been disclosed. A person of ordinary skill in the art would realize, however, that certain modifications come within the teachings of this invention. Therefore, the following claims should be studied to determine the true scope and content of the invention.

What is claimed is:

1. A gasket for insulating a joint between a high temperature member and a low temperature member comprising:

a gasket body having a first gasket section connected to a second gasket section by a hinge portion located alone a periphery of said gasket body;

a plurality of openings in both said first and second sections formed in predetermined locations, each of said openings having a central axis defined by a periphery of said openings;

said second section being disposed above said first section at a predetermined acute angle forming a gap between said first and second sections;

said second section openings are partially aligned and overlying said first section openings to form overlying pairs of openings, wherein each opening of said opening pairs has its central axis intersecting the central axis of its corresponding opening; and wherein said gasket body further comprises a metallic backing plate having inner and outer surfaces arid a heat insulator material attached to said backing plate.

2. The gasket of claim 1, wherein said hinge portion extends along a majority of one side of said body.

3. The gasket of claim 2, wherein said hinge portion is continuous.

4. The gasket of claim 2, wherein said hinge portion is interrupted, comprising a plurality of straps spaced apart along said one side.

5. The gasket of claim 1, wherein said hinge portion comprises a plurality of straps spaced apart along one side of said body.

6. The gasket of claim 1, wherein said first and second sections have substantially flat inner and outer surfaces.

7. The gasket of claim 1, wherein each of said openings has a common size.

8. The gasket of claim 1, wherein said acute angle is approximately 1 to 15 degrees prior to installation between mating members.

9. A gasket for insulating a low temperature member from a high temperature member comprising:

a generally oval gasket body having a first gasket section connected to a second gasket section by a hinge portion extending alone a substantially straight side of said oval body;

a plurality of openings in both said first and second sections formed in predetermined locations, each of said openings having a central axis;

said second section being disposed above said first section at a relative angle of approximately 1–15 degrees to form a gap between said first and second sections such that said second section openings are partially aligned and oppositely facing said first section openings to form partially aligned pairs of openings for allowing insertion of a fastener device, wherein each opening of said opening pairs has its central axis intersecting the central axis of its corresponding opening; and wherein said gasket body further comprises a metallic backing plate having inner and outer surfaces and a heat insulator material connected to said backing plate.

10. A method of forming a gasket comprising the steps of:

securing a sheet of insulator material to one side of a metallic sheet;

forming a pair of laterally spaced apart sections connected by a hinge portion;

providing a plurality of spaced apart openings at preselected locations in each of said sections;

bending one of said sections toward an other of said sections along said hinge portion to form an acute angle between said sections of approximately 1–15 degrees for partially aligning said openings in an overlying, facing relationship.

* * * * *

UNITED STATES PATENT AND TRADEMARK OFFICE
CERTIFICATE OF CORRECTION

PATENT NO : 6,003,877
DATED : December 21, 1999
INVENTOR(S) : Neil Allen Martin

It is certified that error appears in the above-identified patent and that said Letters Patent is hereby corrected as shown below:

Col. 4, line 25 replace "alone" with --along--.

Col. 4, line 40 replace "arid" with --and--.

Col. 4, line 63 replace "alone" with --along--.

Signed and Sealed this

Twenty-fifth Day of July, 2000

Attest:

Q. TODD DICKINSON

Attesting Officer

Director of Patents and Trademarks